(12) United States Patent
Lee et al.

(10) Patent No.: US 6,461,107 B1
(45) Date of Patent: Oct. 8, 2002

(54) TURBINE BLADE TIP HAVING THERMAL BARRIER COATING-FORMED MICRO COOLING CHANNELS

(75) Inventors: Ching-Pang Lee, Cincinnati; Ramgopal Darolia, West Chester; Robert Edward Schafrik, Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 09/818,312

(22) Filed: Mar. 27, 2001

(51) Int. Cl.$^7$ ................................................. F01D 5/18
(52) U.S. Cl. ............................... 416/96 R; 416/241 R; 29/889.1
(58) Field of Search ............................. 416/97 A, 97 R, 416/92, 231 R, 241 A, 241 B, 224, 236 R; 415/173.4, 115; 29/889.1, 889.72, 889.721; 427/454, 142

(56) References Cited

U.S. PATENT DOCUMENTS 6,224,337 B1 * 5/2001 Lieland et al. ............ 415/173.4

* cited by examiner

Primary Examiner—Edward K. Look
Assistant Examiner—Kimya N McCoy
(74) Attorney, Agent, or Firm—David L. Narciso; McNees, Wallace & Nurick

(57) ABSTRACT

The present invention provides for cooling the squealer tip region of a high pressure turbine blade used in a gas turbine engine comprising coating the squealer tip with a metallic bond coat. Micro grooves oriented in the radial direction are fabricated into the airfoil on the interior surface of the squealer tip above and substantially perpendicular to the tip cap. A micro groove oriented in the axial direction is fabricated along the joint corner between the squealer tip side wall and the, tip cap to connect and act as a plenum with all of the micro grooves oriented in the radial direction. Tip cap cooling holes are drilled through the tip cap and connected to the micro groove that ultimately forms a plenum. TBC ceramic is then deposited on both blade external surfaces and the tip cavity, forming micro channels from micro grooves as a result of self shadowing. In this manner, cooling fluid passes from a cooling fluid source through the tip cap holes and into the plenum created by the micro channel, subsequently passing into the micro channels that are oriented in the radial direction. Cooling fluid is thereby directed through the micro channels to cool the squealer, exiting in the vicinity of the tip. Since the TBC is porous, some of the cooling fluid will also flow through the TBC to provide transpiration cooling. The present invention further comprises both the cooled blade and squealer tip region formed by the foregoing methods and the blade and squealer tip with the micro channels for cooling the squealer tip.

26 Claims, 3 Drawing Sheets

TURBINE BLADE TIP HAVING THERMAL BARRIER COATING-FORMED MICRO COOLING CHANNELS

CROSS-REFERENCE TO RELATED APPLICATIONS

This application is related to co-pending applications assigned to the assignee of the present invention which are identified as Ser. No. 09/818,385 entitled "Turbine Airfoil Trailing Edge With Micro Cooling Channels" and Ser. No. 09/818,311, entitled "Process for Forming Micro Cooling Channels Inside a Thermal Barrier Coating System Without Masking Material," and references co-pending applications assigned to the assignee of the present invention, which are identified as Ser. No. 09/707,023 entitled "Directly Cooled Thermal Barrier Coating System", Ser. No. 09/707,024 entitled "Multi-layer Thermal Barrier Coating with Integrated Cooling System," Ser. No. 09/707,027 entitled "Integrated Cooling in Thermal Barrier Coating", and Ser. No. 09/818,384 entitled "Cooled Thermal Barrier Coatings On a Turbine Blade Tip," the contents of which are incorporated herein by reference.

FIELD OF THE INVENTION

This invention relates generally to gas turbine engines, and in particular, to a process for cooling a flow path surface region on a turbine airfoil.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine aft of the compressor, which are in contact with these hot gases. Operation of these engines at gas temperatures that are above the metal part melting temperatures is a well established art, and depends in part on supplying a cooling fluid to the outer surfaces of the metal parts through various methods. Metal parts of these engines that are particularly subject to high temperatures, and thus require particular attention with respect to cooling, are, for example, combustor liners and the metal parts located aft of the combustor including high pressure turbine airfoils, such as turbine blades and turbine vanes.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the components downstream of the combustors such as the vanes and the blades of the turbine. In current engines, the turbine vanes and blades are made of nickel-based superalloys, and can operate at temperatures of up to 2100°–2200° F. with appropriate well-known cooling techniques.

The metal temperatures can be maintained below their melting levels with current cooling techniques by using a combination of improved active cooling designs and thermal barrier coatings (TBCs). For example, with regard to the metal blades and vanes employed in aircraft engines, some cooling is achieved through convection by providing passages for flow of cooling air from the compressor internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engines, a process known as film cooling.

In another approach, a TBC is applied to the turbine blade component, which forms an interface between the metallic component and the hot gases of combustion. The TBC includes a ceramic coating that is applied to the external surface of metal parts to impede the transfer of heat from hot combustion gases to the metal parts, thus insulating the component from the hot combustion gas. This permits the combustion gas to be hotter than would otherwise be possible with the particular material and fabrication process of the component.

TBCs include well-known ceramic materials, such as, for example, yttrium-stabilized zirconia (YSZ). Ceramic TBCs usually do not adhere well directly to the superalloys used as substrate materials. Therefore, an additional metallic layer called a bond coat is placed between the substrate and the TBC. The bond coat may be made of an overlay alloy, such as a MCrAlX, or other composition more resistant to environmental damage than the substrate, or alternatively, the bond coat may be a diffusion nickel aluminide or platinum aluminide. The surface of the bond coat oxidizes to form a thin, protective aluminum oxide scale that provides improved adherence to the ceramic top coatings. The bond coat and overlying TBC are frequently referred to as a thermal barrier coating system.

Multi-layer coatings are well known in the art. For example, U.S. Pat. No. 5,846,605 to Rickerby et al. is directed to a coating having a plurality of alternate layers having different structures that produce a plurality of interfaces. The interfaces provide paths of increased resistance to heat transfer to reduce thermal conductivity.

Rickerby et al. teaches a traditional bond coat overlying a metallic substrate bonded to a TBC. The TBC comprises a plurality of layers, each layer having columnar grains, the columnar grains in each layer extending substantially perpendicular to the interface between the bond coating and metallic substrate. The structure is columnar to ensure that the strain tolerance of the ceramic TBC is not impaired. The difference in structure of the layers is the result of variations in the microstructure and/or density/coarseness of the columnar grains of the ceramic. These differences assist in providing to resistance to the transfer of heat across the thermal barrier coating.

Improved environmental resistance to destructive oxidation and hot corrosion is desirable. Additionally, the alloying elements of the bond coat interdiffuse with the substrate alloy at elevated temperatures of operation, changing the composition of the protective outer layer. Over time, as the airfoils are refurbished, walls of the airfoils are consumed, which reduces load carrying capability and limits blade life. Also, this interdiffusion can also reduce environmental resistance of the coating, causing loss of material, as layers of material are lost due to corrosive and oxidative effects. This interdiffusion and its adverse effects can be reduced by controlling the temperature of the component in the region of the bond coat/substrate interface. However, even with the use of advanced cooling designs and thermal barrier coatings, it is also desirable to decrease the requirement for cooling; because reducing the demand for cooling is also well known to improve overall engine operating efficiency.

One efficient cooling technique is film cooling. Film cooling is achieved by passing cooling air through discrete film cooling holes, typically ranging from 0.015" to about 0.030" in hole diameters. The film cooling holes are typically drilled with laser or by electro-discharge machining (EDM) or electro-stem (ES) machining. Due to mechanical limitations, each film hole has an angle ranging from 20° to 90° relative to the external surface. Therefore, each film jet exits from the hole with a velocity component perpendicular to the surface. But, because of this vertical velocity component and a complex aerodynamic flow circulation near the tip of a turbine blade, commonly referred to as the "squealer tip", each film jet will have a tendency to lift or blow off from the external surface and mix with the hot exhaust gases, resulting in poor film cooling effectiveness in the area surrounding the squealer tip.

Thus, there is an ongoing need for an improved thermal barrier coating system surrounding the squealer tip, wherein the environmental resistance and long-term stability of the thermal barrier coating system is improved so that higher engine efficiencies can be achieved. The bond coat temperature limit is critical to the TBC's life and has an upper limit of about 2100° F. Once the bond coat exceeds this temperature, the coating system tends to quickly deteriorate, due to high temperature mechanical deformation and oxidation, as well as from interdiffusion of elements with the substrate alloy and subsequent degradation due to loss of its superior environmental resistance. The coating system can separate from the substrate exposing the underlying superalloy component to damage from the hot gasses.

In particular, the squealer tip is the most difficult location to cool in a turbine blade. The squealer tip is located away from the convection cooling in the center of the blade, and the complex aerodynamic flow field near the squealer tip makes film cooling very inefficient. This inefficient cooling results in tip deterioration much earlier than desired, and requires tip repairs after relatively short time in service to recover the tip clearance for better turbine efficiency.

As described above, to be effective, a TBC system requires active cooling on the backside of the location to be cooled. In the past, a TBC system was not used in the squealer tip region because, due to physical limitations, no effective backside cooling was available to make the TBC system effective. During the blade manufacturing process, to prevent the TBC from adhering to this area, the squealer tip and tip cap are usually masked during the TBC coating process. However, recently, in order to reduce manufacturing costs, the TBC coating application has been extended to cover the squealer tip region, thus avoiding the time-consuming masking process. It is therefore advantageous to further improve squealer tip cooling efficiency by intentionally incorporating an effective TBC coating system that includes backside cooling to extend squealer tip life.

In a co-pending application identified as Attorney Docket No. 13DV-13654 entitled "Cooled Thermal Barrier Coatings On a Turbine Blade Tip", channeled apertures were provided to a substrate in a preselected diameter sufficient to allow passage of cooling fluid from a cooling fluid source. A sufficiently thick bond coat was then applied to the substrate such that the bond coat partially filled the apertures. A porous TBC layer was then applied to the bond coat to partially occupy the apertures, followed by application atop the porous TBC layer of an additional dense ceramic TBC layer, denser than the porous TBC layer overlying the bond coat. Optionally, a conventional TBC system was applied on the concave (pressure side) and convex (suction side) of the airfoil surface.

In this manner, cooling fluid passes from a cooling fluid source through a channel aperture substantially adjacent to the squealer tip into the porous TBC. Because the channel aperture is at least partially filled with porous TBC material, cooling fluid flowed through the partially filled passageways. But, due to the increased resistance to flow, the cooling fluid expanded its flow path into the adjacent, porous TBC layer, continuing to flow between the bond coat and the dense coat, thereby directing cooling fluid to the squealer tip as the fluid exits the blade. However, because the porosity in the porous TBC layer is randomly distributed, there is little control of cooling fluid through the porous TBC and cooling can be irregular. What is needed are further improved designs that will allow a turbine engine blade squealer tip to run at higher operating temperatures, thus improving engine performance without the need for additional cooling air. This can be achieved by providing a regular cooling pattern through the porous TBC to the squealer tip. It is also desirable to have a system that can take advantage of the thermal insulation provided by TBC. The present invention fulfills this need, and further provides related advantages.

SUMMARY OF THE INVENTION

The present invention provides for cooling the squealer tip region of a high pressure turbine blade used in a gas turbine engine. The squealer tip is coated with a metallic bond coat and micro grooves are fabricated in an airfoil oriented in a substantially radial direction on the interior surface of the squealer tip above the tip cap. A micro groove oriented in a substantially axial direction is fabricated along or near the joint corner between the squealer tip side wall and the tip cap to provide fluid communication with all of the radial micro grooves. Tip cap cooling holes are drilled through the tip cap so as to be in fluid communication with the axial micro groove. TBC ceramic is then deposited by a shadowing technique on both blade external surfaces and the tip cavity, forming micro channels from the micro grooves.

In this manner, cooling fluid passes from a cooling fluid source through the tip cap holes and into a plenum created by the axially-oriented micro channel. The cooling fluid then passes from the plenum into the radially-oriented micro channels. Cooling fluid is thereby directed through the micro channels to cool the squealer tip by exiting to the tip. Since the TBC is porous, some of the cooling fluid will also provide transpiration cooling as it flows through the TBC.

The present invention further comprises both a cooled blade and a squealer tip region formed by the foregoing methods and techniques as well as the blade and squealer tip having micro channels for cooling the squealer tip.

One advantage of the present invention is that convection cooling through the micro channels inside or adjacent to a bond coat layer provides direct and efficient cooling for squealer tips.

Another advantage of this invention is that the TBC on the external surfaces of the squealer tip also becomes a very effective insulation. This insulating TBC has increased service life due to the backside cooling provided by the present invention. The combination of the effective convection cooling inside the micro channels and effective thermal insulation on the external surfaces of the squealer tip will lower the temperature of the squealer tip as compared to conventional and current designs, providing a longer service life. The beneficial cooling effects of the present invention create increased adherence of the pressure and suction side TBC to the airfoil component.

By removing heat from this region, the integrity of the bond coat also can be maintained at higher engine firing temperatures by inhibiting temperature-induced diffusion, resulting in a more efficient usage of cooling fluid than that of the prior art to achieve a higher turbine engine efficiency and performance while improving squealer tip service life.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, Rene' 80, Rene' 41, Rene' 125, Rene' 77, Rene' N4, Rene' N5, Rene' N6, $4^{th}$ generation single crystal superalloy, MX-4, Hastelloy X, and cobalt-based HS-188. The usage of these materials at elevated temperatures is limited by their environmental properties in oxidative and corrosive environments at these elevated temperatures.

Figure 1:
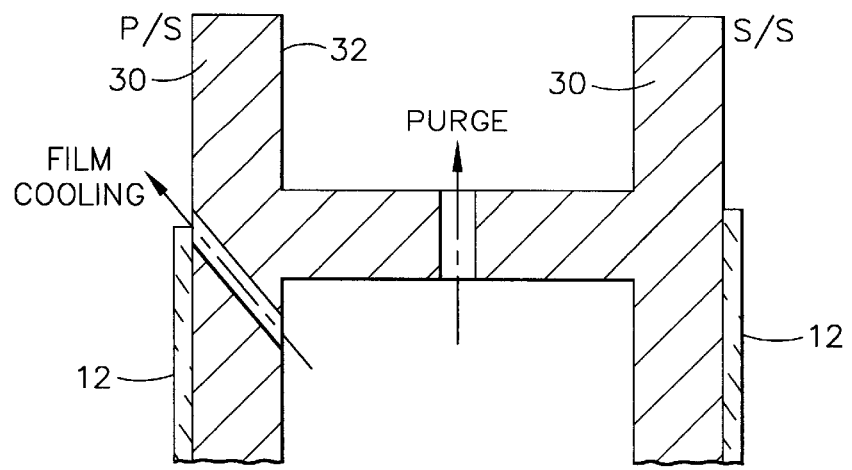
FIG. 1 is a representation of a form of current practice cooling of a turbine blade tip.

As shown in FIG. 1, current squealer tip design utilizes cavity purge holes and pressure side (P/S) film cooling holes that do not permit cooling fluid to flow into contact with the squealer tip. In contrast, the present invention provides both convection cooling and insulation to actively cool the squealer tip.

Referring now to FIGS. 2 through 5, a bond coat 2 is applied to the substrate 4 using known techniques to a thickness of from about 0.0005 inch to about 0.005 inch, preferably about 0.002 inch in thickness. Bond coat 2 must be of sufficient thickness so that a structured micro groove 6, 8 (described below) can be formed within bond coat 2. Bond coat 2 applied to substrate 4 is used for both increased environmental protection of substrate 4 and to facilitate adherence of additional layers of ceramic to substrate 4. Bond coats, such as MCrAl(X)s, are applied to the substrate by, for example, physical vapor deposition (PVD) processes such as electron beam evaporation (EB), ion-plasma arc evaporation, sputtering, or plasma spray processes such as air plasma spray (APS), high velocity oxy-fuel (HVOF) or low pressure plasma spray (LPPS) and temperatures can be 1800° F. or higher. PVD processes are applied in a vacuum and thermal sprays can be controlled so as to be applied under non-oxidizing conditions. Diffusion aluminide bond coats may also be formed on substrate in accordance with well-known techniques.

For example, bond coat 2 may be a diffusion aluminide, such as NiAl or PtAl formed by applying aluminum to an appropriate thickness to a superalloy substrate that may include a thin, deposited layer of platinum, such as for example by, vapor phase aluminiding or chemical vapor deposition (CVD). Alternatively, bond coat 2 may be a MCrAl(X) where M is an element selected from the group consisting of Fe, Co and Ni and combinations thereof and (X) is an element selected from the group of gamma prime formers, solid solution strengtheners, consisting of, for example, Ta, Re and reactive elements, such as Y, Zr, Hf, Si, and grain boundary strengtheners consisting of B, C and combinations thereof, in which deposition typically is by PVD or thermal spray.

After bond coat 2 has been deposited to a sufficient thickness, at least one structured radial micro groove 6 is fabricated within the bond coat 2 substantially parallel to the bond coat/substrate interface, for example, by laser machining, electro-chemical machining (ECM) electro-discharge machining (EDM) or photolithography or other process capable of providing the required sizes and tolerances. The groove size and spacing are about 0.0005 inch to about 0.010 inch and of such depth that the groove size does not penetrate the bond coat and expose the underlying substrate material, preferably about 0.002 inch, with the radial structured micro groove 6 fabricated in a plane substantially parallel to the plane of the substrate surface.

As used herein the term in a generally "radial direction" refers to a direction extending from the centerline of the engine outward toward the casing, substantially perpendicular to the flow of gases through the engine, and "radial surface" or "radial feature" is a surface or feature that extends parallel to or substantially parallel to that direction. The term "axial direction" refers to a direction extending along or substantially parallel to the centerline of the engine and to the flow of gases through the engine, and substantially perpendicular to the radial direction, while the term "axial surface" or "axial feature" is a surface or feature that extends parallel to or substantially parallel to that direction.

Figure 2:
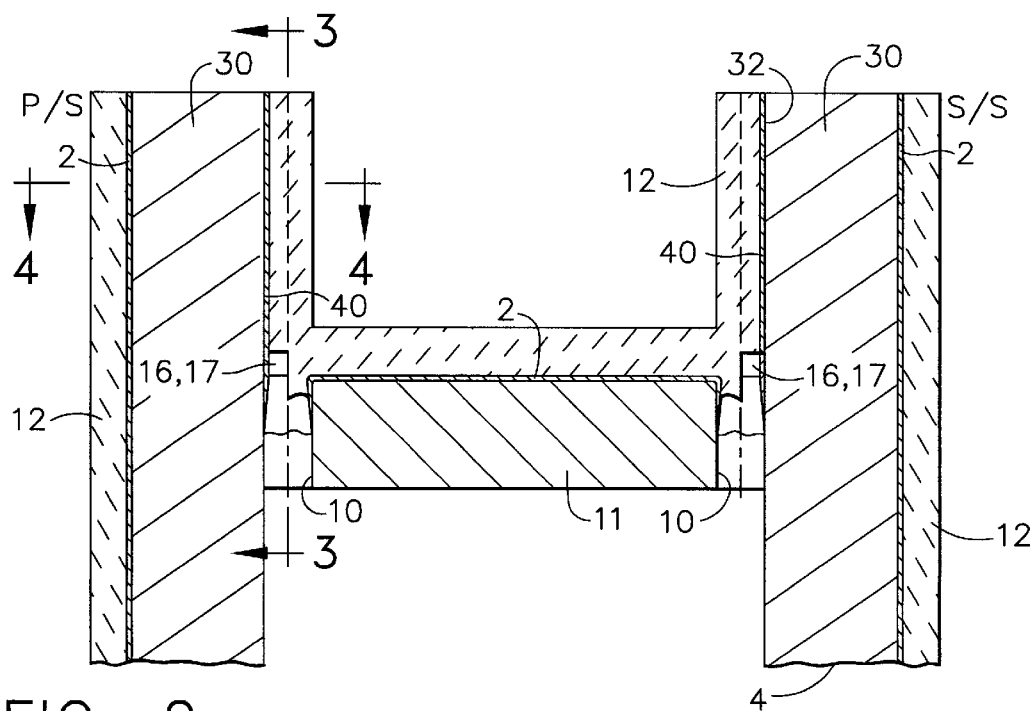
FIG. 2 is a representation of one form of the multi-layer ceramic coating of the present invention.
Figure 3:
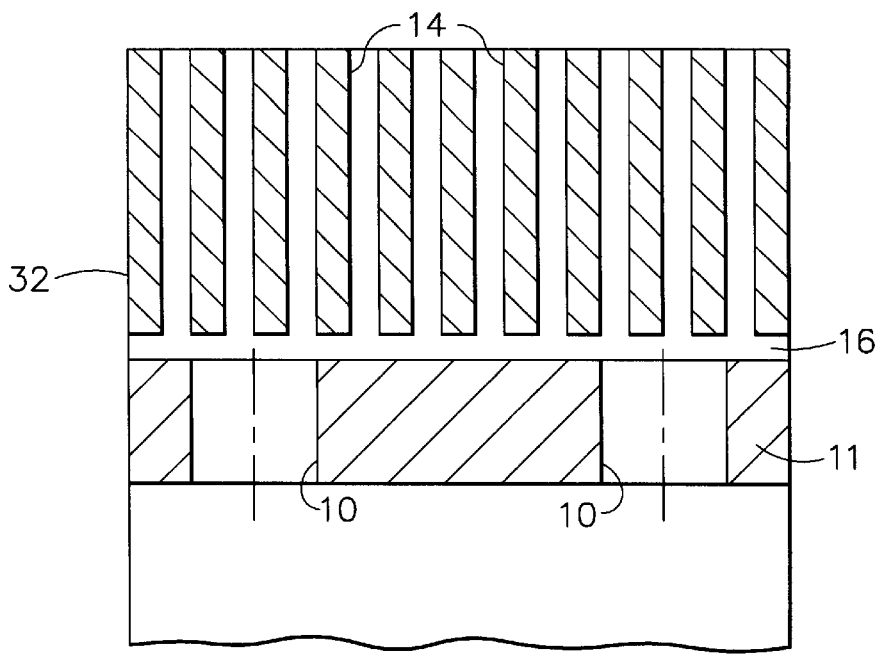
FIG. 3 is a representation of a view at 3—3 of FIG. 2.
Figure 5:
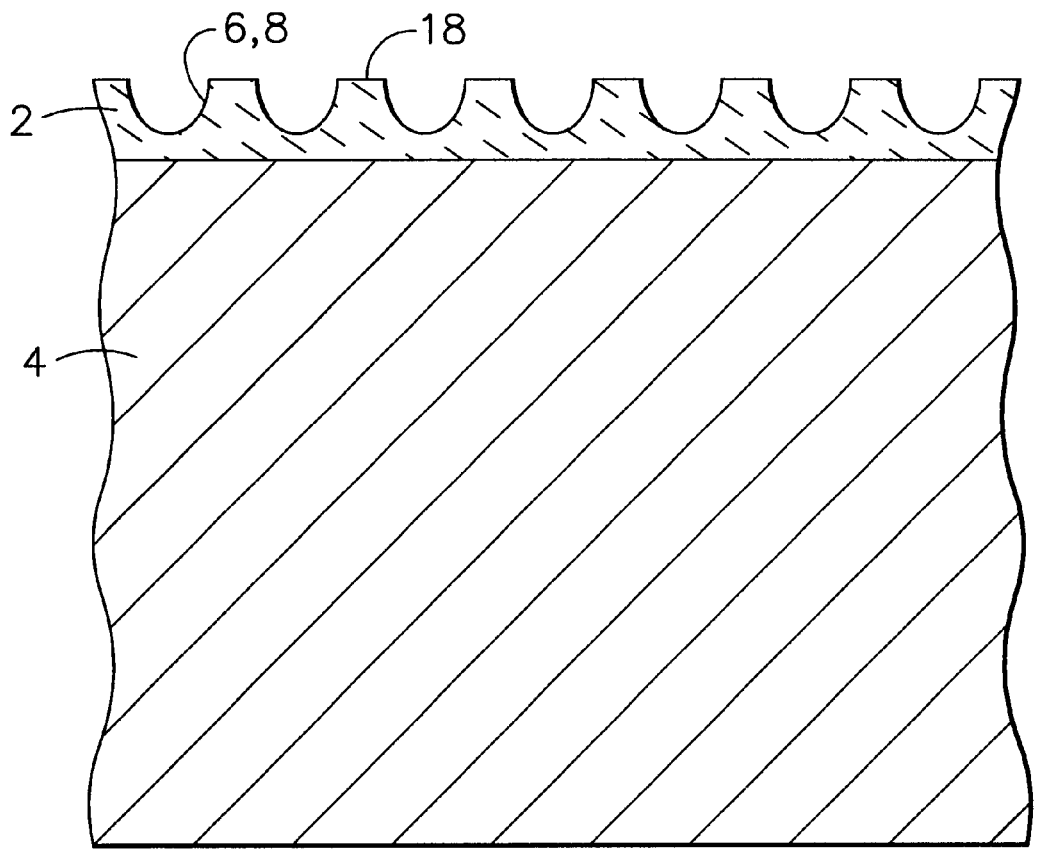
FIG. 5 is a representation of a form of the micro grooves created in the bond coat.

Referring to FIGS. 2 and 5, micro grooves 6, extending in a radial direction are formed on an interior vertical surface 40 of the squealer tip above the tip cap 11, that is, the surface of the squealer tip that extends along the airfoil in a radial direction outward from and substantially perpendicular to tip cap 11 to connect with that portion of the squealer tip 30 that is substantially parallel to the surface of the tip cap 11 as shown in FIG. 2.

A structured micro groove 8 oriented in an axial direction is fabricated within the bond coat 2, for example, by laser machining, ECM, EDM or photolithography. In cross-section, structured micro groove 8 is identical to micro groove 6, as shown in FIG. 5. The groove size and spacing are about 0.0005 inch to about 0.010 inch, preferably about 0.002 inch with the structured micro groove 8 fabricated into bond coat along a plane substantially parallel to the plane of the substrate surface, along the joint corner at the intersection of the radially oriented wall 32 of squealer tip 30 and tip cap 11, such that structured micro groove 8 oriented in an axial direction forms a plenum or manifold in fluid communication at one end with structured micro grooves 6 oriented in a radial direction.

The cross section of the structured micro grooves 6, 8 may assume any geometric form, for example, a rectangle, a circle, a triangle or any other shape that will facilitate the flow of cooling fluid. Structured micro groove 8 oriented in an axial direction is in fluid communication with a fluid supply source (not shown) contained within the airfoil component by way of at least one fluid supply channel machined by known methods through the tip cap 11. Tip cap hole 10 provides fluid communication micro groove oriented in an axial direction. These axially oriented micro grooves form the coolant manifold 17 depicted in FIG. 2, as will be discussed. Tip cap hole 10 and fluid supply channel are of sufficient diameter to allow an effective amount of cooling fluid to pass, preferably about 0.006' to about 0.020' in diameter from the interior of the airfoil to coolant manifold 17.

Figure 4:
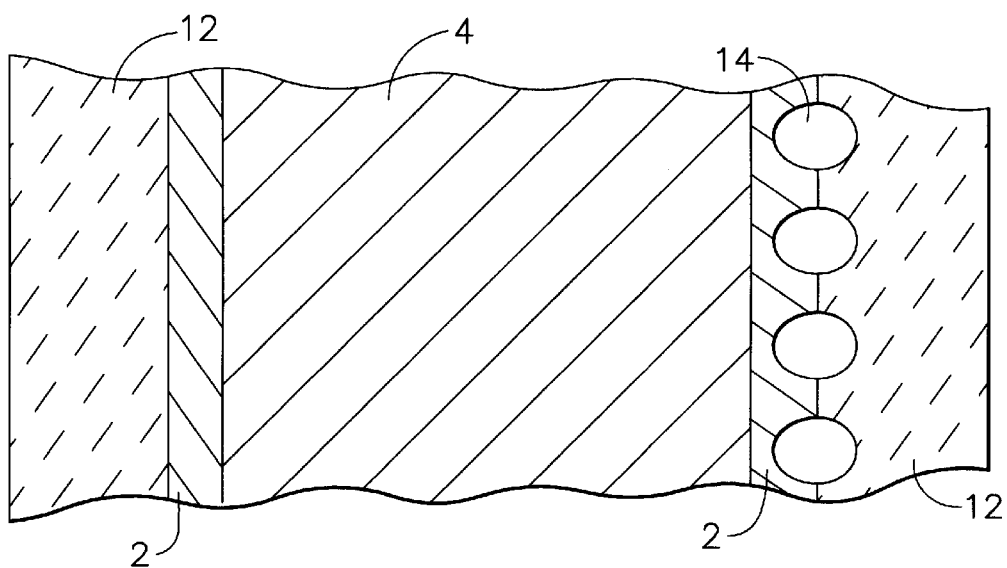
FIG. 4 is a representation of a view at 4—4 of FIG. 2.

After application of the bond coat to the substrate surface to a thickness of at least 0.0005 inch, preferably at least about 0.001 inch, and most preferably about 0.002 inch thickness, structured micro grooves 6, 8 are machined along the radially oriented wall 32 of squealer tip 30 using known techniques, for example, by laser machining, electrochemical machining (ECM), electro-discharge machining (EDM) and photolithographic etching. As shown in FIG. 4, a TBC 12, preferably a porous TBC, for example, porous yttria-stabilized zirconia (YSZ), is then applied over bond coat 2 using well known deposition techniques to achieve a TBC thickness of at least about 0.003 inch. The porous YSZ structure can be achieved, for example, by applying the YSZ using a PVD process such as electron beam PVD or thermal spray processes at temperatures in the range of 1600°–1800° F., which are lower than traditional YSZ application temperatures of 1825°–2150° F. Other methods may be utilized independent of the reduced temperature techniques or in combination with the reduced temperature techniques to achieve the porous YSZ structure. Alternatively, the porous TBC can be a ceramic such as a thin layer of zirconia modified by other refractory oxides such as oxides formed from Group IV, V and VI elements or oxides modified by Lanthanide series elements such as La, Nd, Gd, Yb and the like.

TBC layer 12 is the subject of a co-pending application assigned to the assignee of the present invention, which is identified as Attorney Docket No. 13DV-13528 and titled "Integrated Cooling in Thermal Barrier Coating". Since the TBC 12 is porous, some of the cooling fluid will flow through the TBC 12 to provide transpirational cooling of the TBC layer 12. The porosity of the TBC layer 12 can be varied as desired using well known methods for varying deposition densities such as by varying the deposition temperature.

As the porous TBC 12 is deposited onto the grooved surfaces, radial micro channels 14 and axial micro channel 16 are formed above the grooves 6, 8 due to the shadowing effect of the TBC 12 depositing on top of the peaks 18 (FIG. 5) of the micro grooves 6, 8. The shadowing effect may be best visualized by placing an object in front of a light source and observing the shadow cast by that object. Light rays passing around the object would represent TBC being deposited, while the shadow cast by the object would represent the void in the deposited TBC. It is this void which ultimately forms the structured radial micro channel 14 and axial micro channel 16.

The dimensions of the radial and axial micro channel 14, 16 in cross section are of sufficient size to allow passage of an effective amount of cooling fluid, about 0.001 to about 0.010 inch in diameter, and preferably about 0.002 to 0.004 inch in diameter when circular, and may be arcuate or may assume other geometric forms having equivalent dimensions, that is, yielding an equivalent cross-section size. The cross section of the radial and axial micro channel 14, 16 may take any preselected form such as, for example, a parallelogram, rectangle, an oval, a triangle or a circle.

Cooling fluid (not shown), for example, air, is thereby routed from an engine cooling fluid supply (not shown) into micro channel 16 oriented in an axial direction, which serves as a plenum to supply cooling fluid to at least one micro channel 14 oriented in a radial direction. After passage through micro channel 14, the cooling fluid, which is at an elevated temperature, is expelled, typically into the gas stream at the squealer tip axial surface, although, as mentioned above, there is some transpiration through the TBC. In this manner, the bond coat 2 is kept at a reduced temperature through active convection cooling throughout the entire squealer tip.

In another embodiment of the present invention, the structured micro grooves described above first are partially machined, for example, by a laser, by an ECM technique, cast during manufacture, or etched, into the surface of the turbine blade tip substrate. A bond coat is then applied to the substrate so as to coat, but not fill, the structured micro grooves. A porous TBC layer is deposited using a shadowing technique, as described above, to form the radial and axial micro channels at the interface between the bond coat and the substrate. At least one micro groove is in communication with the cooling fluid supply to provide active cooling of the squealer tip in the manner as described above.

In still another embodiment of the present invention, a bond coat and first layer of TBC is applied to the relatively smooth substrate comprising at least the vertical walls of the squealer tip adjacent the tip cap and the tip cap using known techniques. The bond coat may also be applied to the entire squealer tip if no masking operations are to be performed on the squealer tip. The effect of applying bond coat to this area, and any subsequent TBC, is that the applied material will be worn off by the engine during its initial cycles, as the airfoils "rub in." If necessary, at least one hole is machined for example, using a laser, through the bond coat and first layer of TBC to communicate with a cooling fluid supply, to allow for flow of cooling fluid as previously set forth. Structured radial and axial micro grooves are machined in the first TBC layer such as by laser machining. A second TBC layer is then applied using the shadowing technique as described above. In this manner, the location of the structured micro groove, hence, the micro channel, may be placed at any preselected position within the TBC layer between the bond coat and the hot gaseous atmosphere.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cooling system for cooling of a squealer tip of a high pressure turbine blade used in a gas turbine engine comprising:
   a superalloy tip cap;
   a superalloy squealer tip extending outward in an engine radial direction from the superalloy tip cap into a hot gas stream of the engine;
   at least one fluid supply channel having a first and second end, the first end terminating in a tip cap hole located on a surface of the tip cap, the second end in fluid communication with a cooling circuit located within the blade, wherein the at least one fluid supply channel has a diameter to permit an effective flow of cooling fluid;

a bond coat having a thickness of about 0.0005" to about 0.005' applied to the tip cap surface;

at least one structured micro channel oriented in a radial direction formed by shadowing a thermal barrier coating (TBC) onto a structured micro groove, said micro groove fabricated in a plane substantially parallel to the plane of the substrate surface in a generally radial direction on an interior surface of the squealer tip above and substantially perpendicular to the tip cap in fluid communication with the at least one fluid supply channel;

at least one structured micro channel oriented in an axial direction formed by shadowing a TBC onto a structured micro groove fabricated in a plane substantially parallel to the plane of the substrate surface at a joint corner between the squealer tip and the tip cap, such that the structured micro groove oriented in the axial direction and the resultant axially oriented micro channel is in fluid communication with the at least one structured micro groove oriented in the radial direction and resultant axially oriented micro channel and the tip cap hole; and, a means for providing cooling fluid to the tip cap hole.

2. The cooling system of claim 1 wherein the at least one of the structured micro grooves oriented in the radial direction and the structured micro groove oriented in the axial direction is fabricated within the bond coat.

3. The cooling system of claim 1 wherein the at least one of the structured micro grooves oriented in the radial direction and the structured micro groove oriented in the axial direction is fabricated into the substrate surface.

4. The cooling system of claim 1 wherein the at least one of the structured micro grooves oriented in the radial direction and the structured micro groove oriented in the axial direction is fabricated within the TBC.

5. The cooling system of claim 1 wherein the at least one of the structured micro grooves oriented in the radial direction is fabricated by the process selected from the group consisting of laser machining, electrochemical machining, electro-discharge machining and photolithography.

6. The cooling system of claim 1 wherein the TBC is deposited by shadowing using electron beam physical vapor deposition (EB-PVD).

7. The cooling system of claim 1 wherein the at least one fluid supply channel has a diameter of about 0.006" to about 0.020'.

8. The cooling system of claim 1 wherein the bond coat has a thickness of about 0.002".

9. The cooling system of claim 1 wherein the bond coat is an aluminide selected from the group consisting of NiAl, PtAl and combinations thereof.

10. The cooling system of claim 1 wherein the bond coat is a MCrAl(X) where M is an element selected from the group consisting of Fe, Co and Ni; and X is an element selected from the group consisting of gamma prime formers, solid solution strengtheners, grain boundary strengtheners, reactive elements and combinations thereof.

11. The cooling system of claim 10 wherein X is an element selected from the group consisting of Zr, Hf, Y and rare earth elements.

12. The cooling system of claim 1 wherein the TBC is a porous TBC and has a thickness of at least about 0.003".

13. The cooling system of claim 1 whereby the cooling fluid is diffused and flows through the TBC.

14. The cooling system of claim 1 wherein the radial and axial micro groove size and spacing are about 0.0005' to about 0.010'.

15. The cooling system of claim 1 wherein the radial and axial micro groove size and spacing are about 0.002'.

16. The cooling system of claim 1 wherein the cooling fluid is air.

17. A method for cooling of a squealer tip region of a high pressure turbine blade used in a gas turbine engine comprising the steps of:

machining at least one fluid supply channel having a diameter of about 0.006" to about 0.020" in a tip cap of the turbine blade to allow passage of cooling fluid from a cooling fluid source within the blade to a surface of the tip cap;

applying a bond coat having a thickness of about 0.0005" to about 0.005" to the surface of the tip cap and at least one squealer tip wall;

fabricating at least one structured micro groove oriented in the radial direction in a plane substantially parallel to the plane of the substrate surface in a generally radial direction on an interior radially oriented surface of a squealer tip above and perpendicular to the tip cap in fluid communication with the at least one fluid supply channel;

fabricating at least one structured micro groove oriented in an axial direction in a plane substantially parallel to the plane of the substrate surface at a joint corner between the squealer tip and the tip cap, such that the structured micro groove oriented in the axial direction is in fluid communication with the at least one structured micro groove oriented in the radial direction and the at least one fluid supply channel;

shadowing a TBC to the at least one structured micro groove oriented in the radial direction and the at least one structured micro groove oriented in the axial direction to form at least one radial micro channel and at least one axial micro channel in fluid communication with each other; and, passing cooling fluid from the cooling fluid source through the at least one fluid supply channel into the micro channel oriented in the axial direction, the axially oriented micro channel supplying cooling fluid to the at least one micro channel oriented in the radial direction to exit into the gas stream at the squealer tip.

18. The method of claim 17 wherein the at least one fluid channel is machined in the tip cap by laser drilling.

19. The method of claim 17 wherein the bond coat is applied a thickness of about 0.002'.

20. The method of claim 17 wherein at least one of the at least one micro groove oriented in the radial direction and the corresponding at least one micro channel is fabricated within the bond coat.

21. The method of claim 17 wherein at least one of the at least one micro groove oriented in the radial direction and the corresponding at least one micro channel is fabricated in a substrate surface.

22. The method of claim 17 wherein at least one of the at least one micro groove oriented in the radial direction and the corresponding at least one micro channel is fabricated within the TBC.

23. The method of claim 17 wherein the cooling fluid is air.

24. The method of claim 17 wherein the at least one micro groove oriented in the radial direction and the at least one micro groove oriented in the axial direction are fabricated by the process selected from the group consisting of laser machining, electrochemical machining, electro-discharge machining and photolithography.

25. The method of claim 17 wherein the TBC is shadowed using electron beam physical vapor deposition (EB-PVD).

26. A cooling system for cooling of a squealer tip surface region of a high pressure turbine blade used in a gas turbine engine formed by the method of claim 17.

* * * * *